(12) United States Patent
Binmore

(10) Patent No.: US 8,690,066 B2
(45) Date of Patent: Apr. 8, 2014

(54) HIGH TEMPERATURE HIGH PRESSURE TAG

(75) Inventor: Ian Rex Binmore, Houston, TX (US)

(73) Assignee: Axon Tubular Products, Inc., Houston, TX (US)

( * ) Notice: Subject to any disclaimer, the term of this patent is extended or adjusted under 35 U.S.C. 154(b) by 216 days.

(21) Appl. No.: 12/771,766

(22) Filed: Apr. 30, 2010

(65) Prior Publication Data

US 2011/0266353 A1    Nov. 3, 2011

(51) Int. Cl.
*G06K 7/10* (2006.01)
*G06K 19/06* (2006.01)

(52) U.S. Cl.
USPC .......................................... 235/492; 235/451

(58) Field of Classification Search
USPC ............ 235/451, 492; 340/10.1, 572.1–572.8
See application file for complete search history.

(56) References Cited

U.S. PATENT DOCUMENTS

| | | | |
|---|---|---|---|
| 5,731,957 A | 3/1998 | Brennan | |
| 6,100,804 A | 8/2000 | Brady et al. | |
| 6,885,505 B2 * | 4/2005 | Sahm et al. | 359/634 |
| 2004/0052034 A1 | 3/2004 | Senba et al. | |
| 2006/0183979 A1 * | 8/2006 | Rini et al. | 600/300 |
| 2008/0020007 A1 * | 1/2008 | Zang | 424/401 |
| 2009/0007963 A1 * | 1/2009 | Buller et al. | 136/256 |
| 2009/0079545 A1 * | 3/2009 | Chow et al. | 340/10.1 |
| 2009/0211754 A1 * | 8/2009 | Verret et al. | 166/250.12 |
| 2009/0289765 A1 * | 11/2009 | Kaga et al. | 340/10.1 |
| 2010/0295699 A1 * | 11/2010 | Rushing | 340/825.49 |

FOREIGN PATENT DOCUMENTS

| | | |
|---|---|---|
| DE | 4425736 | 1/1996 |
| DE | 20012237 | 10/2000 |
| DE | 10227683 | 1/2004 |
| DE | 102007030829 | 1/2009 |

* cited by examiner

*Primary Examiner* — Tuyen K Vo
(74) *Attorney, Agent, or Firm* — Baker Botts L.L.P.

(57) ABSTRACT

A tag, such as an RFID tag, and system including an RFID tag configured for installation into an object are provided. The tag is configured for use in high temperature and/or high pressure environments such as downhole and subsea applications. The tag includes an electronics module contained within a bead, which is housed in a cavity of a carrier. The bead is surrounded by a protective fluid-like fill material to provide protection to the electronics module and bead and provide fluid-like properties to the electronics module to reduce or eliminate point stresses on the electronics module. The geometry of the tag is such that the entire outline of the tag is contained within the geometry of the object to provide structural protection of the tag.

35 Claims, 4 Drawing Sheets

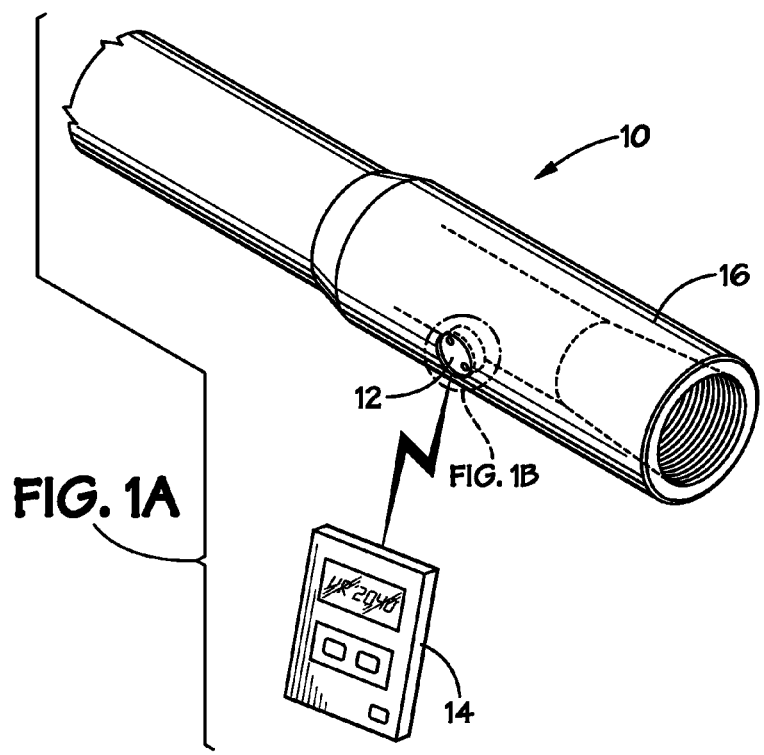
FIG. 1A
FIG. 1B
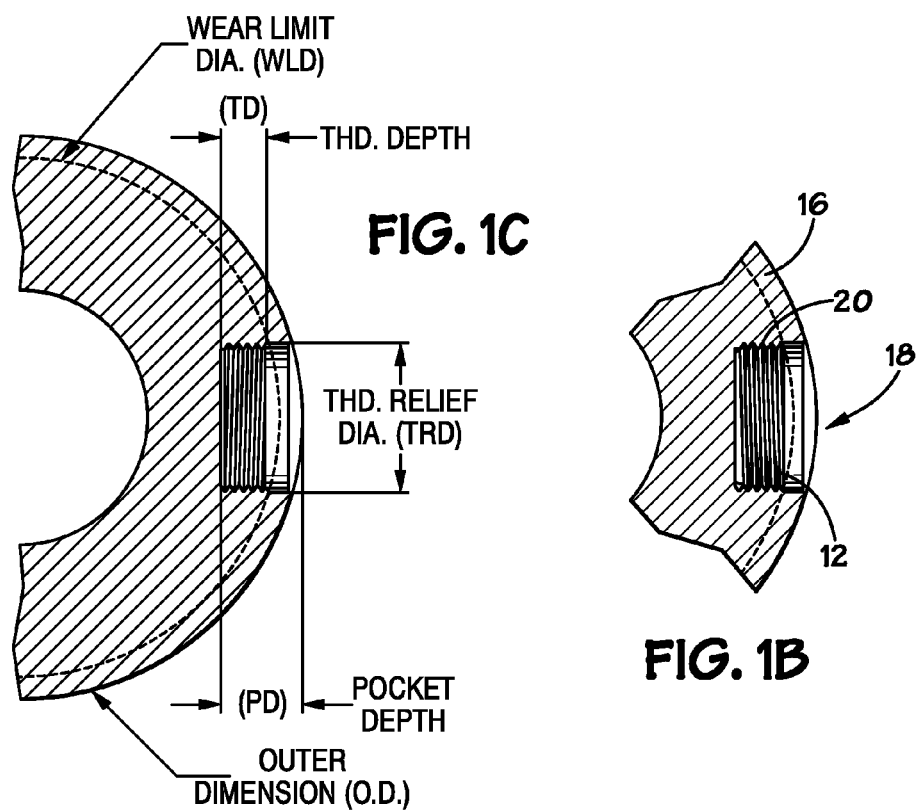
FIG. 1C

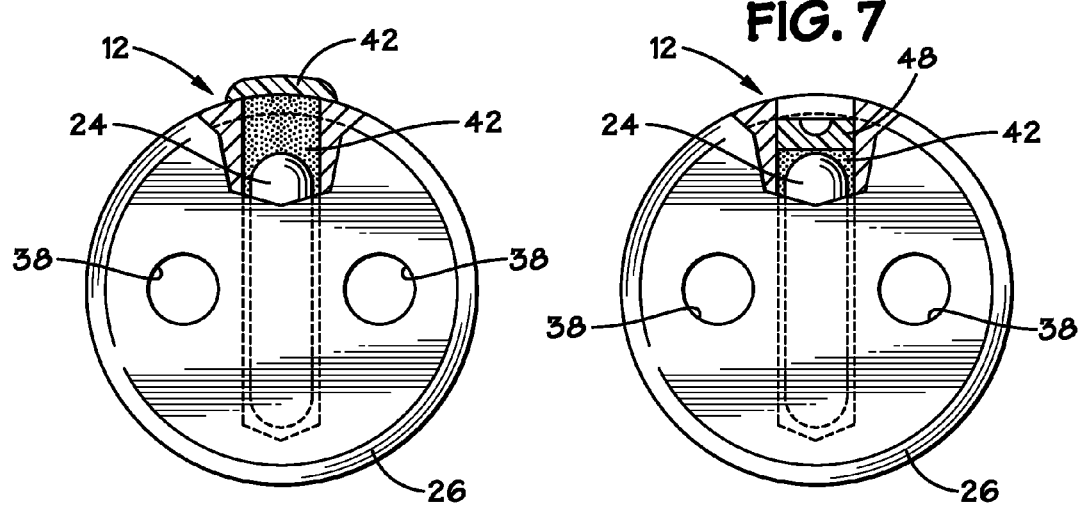
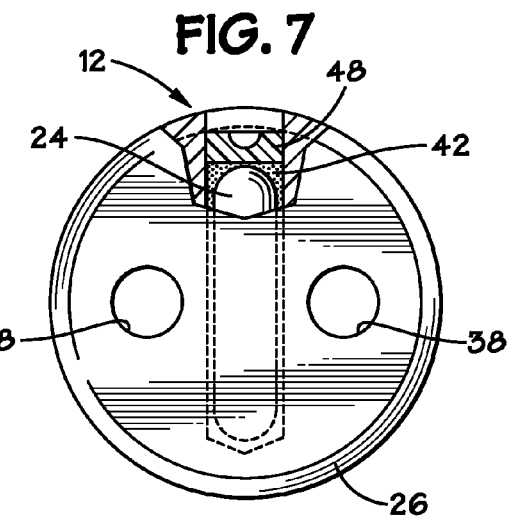
FIG. 6    FIG. 7
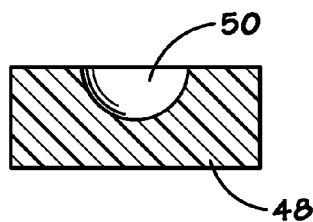
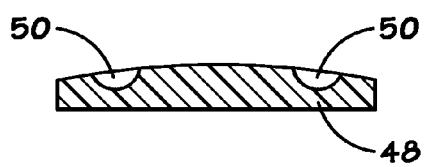
FIG. 8    FIG. 9
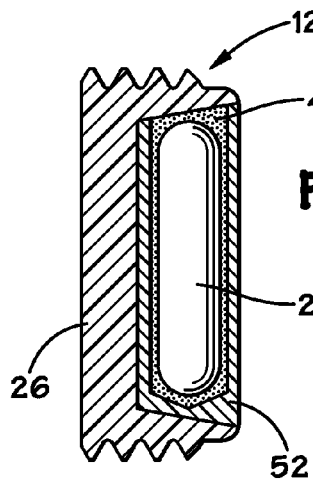
FIG. 10A

HIGH TEMPERATURE HIGH PRESSURE TAG

BACKGROUND

1. Field of Invention

Embodiments of the invention relate generally to identification tags, and more specifically, to Radio-frequency identification (RFID) tags configured for usage in high temperature and/or high pressure environments.

2. Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light and not as admissions of prior art.

Identification tags, such as RFID tags are often used to manage and track objects, such as system components, tools, machinery, equipment, etc., through production, inventory, storage, deployment and/or product use. In general, RFID tags include a microchip or integrated circuit used to transmit and/or store identification information and possibly other information. An external transceiver/interrogator/reader located remotely with respect to the RFID tag is used to receive information from and/or transmit information to the RFID tag. The RFID tag typically includes an antenna that transmits RF signals relating to the identification and/or information stored within the RFID tag.

For certain applications, such as surface and downhole oil and gas applications, RFID tags may be utilized to track equipment and inventory. However, to be particularly useful, the RFID tags should be designed such that equipment can be tracked while in storage, transit, and field use, (i.e., surface, downhole and underwater), depending on the type of equipment and the utilization thereof. Further, for downhole or underwater applications, the durability of such RFID tags presents a number of additional challenges. Among the various considerations are structural integrity through a wide range of temperatures and pressures, as well as mechanical forces, readability of the RFID tag and ease of installation, for instance.

It may be desirable to design an optimized RFID tag for tracking components utilized in surface and downhole applications.

BRIEF DESCRIPTION OF DRAWINGS

Certain embodiments are described in the following detailed description and in reference to the drawings in which:

FIG. 1A illustrates a schematic view of an RFID tag system including a mounted RFID tag, in accordance with embodiments of the invention;

FIG. 1B illustrates an enlarged view of the RFID tag of FIG. 1A, mounted within a material, in accordance with embodiments of the invention;

FIG. 1C illustrates a partial cross-sectional schematic view of the RFID tag pocket configured to receive the RFID tag of FIGS. 1A and 1B, in accordance with embodiments of the invention;

FIG. 6 illustrates a schematic view of the RFID tag, in accordance with a third embodiment of the invention;

FIG. 7 illustrates a schematic view of the RFID tag, in accordance with a fourth embodiment of the invention;

FIGS. 8 and 9 illustrate embodiments of caps employed in the embodiment of FIG. 7; and FIGS. 10A-10D illustrate schematic views of the RFID tag, in accordance with fifth embodiments of the invention.

DETAILED DESCRIPTION

Figure 2:
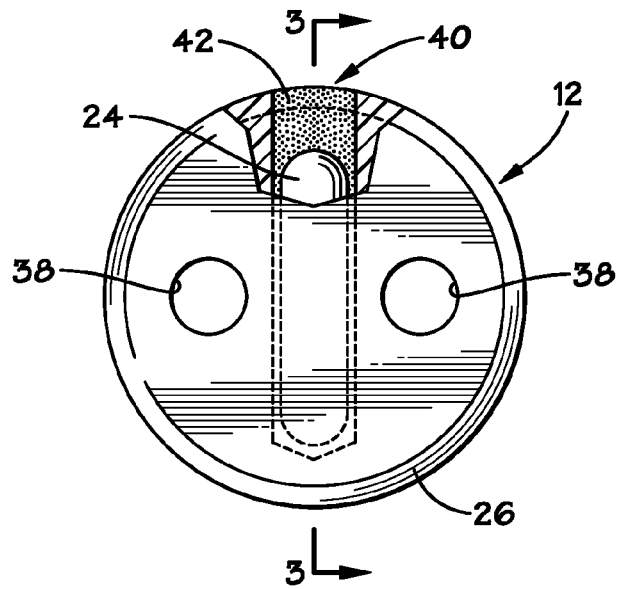
FIGS. 2-4 illustrate schematic views of the RFID tag, in accordance with first embodiments of the invention.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, embodiments of the invention are directed to an identification system including an identification tag, such as an RFID tag, configured for installation into an object. In certain embodiments, the object may include a structure such as a pipe, riser, flange, weldment, casting, or any material or tool used in rugged environments, where high pressures and temperatures may be encountered. In accordance with embodiments of the present invention, the RFID tag is designed for use in high temperature and/or high pressure environments. Depending on the application and the materials used to fabricate the RFID tag, the RFID tag may be particularly well suited for downhole and subsea drilling, mining or industrial equipment. As will be described in further detail below, the disclosed RFID tag is optimized for usage in high temperature and/or high pressure environments and may advantageously provide readability, easy installation, and packaging that is resistant to mechanical and chemical stresses, even in harsh conditions. As discussed further below, the disclosed RFID tag may be designed to survive at sustained (i.e., for at least 1000 hours) temperatures greater than or equal to 165° C. and as low as temperatures of liquid nitrogen. Further, the RFID tag is designed to survive at pressures of up to 40,000 PSI, without significant degradation in functionality. Further, the RFID tag may survive at pressures greater than 40,000 PSI.

Turning now to the drawings, and referring initially to FIG. 1A, an RFID tag system 10 is illustrated. Specifically, the RFID tag system 10 includes an RFID tag 12 and a reader 14. The reader 14 is generally configured to interrogate the RFID tag 12. Accordingly, the reader 14 typically includes a transmitter and receiver for exchanging RFID information with the RFID tag 12. The reader 14 may also include a processor for receiving the RF data from the RFID tag 12 and extrapolating the RF data into meaningful data whereby identification or other stored information can be perceived by a user. In certain embodiments, the reader may be integrated with a computer system.

As will be appreciated, while an RFID tag system 10, including an RFID tag 12 is illustrated and described below, embodiments of the invention may utilize other types of identification tags, which utilize other types of wireless technology, such as Sonic Acoustic Wave (SAW), ultra low frequency, high frequency or ultra high frequency, or systems or combinations of frequency that are used for powering, interrogating or reading, writing or accessing information or identities stored within an electronics module contained in a manner expressed herein. That is, while the exemplary embodiments describe using RF technology to provide identification of the tagged components, the packaging configurations described below may also be used to encase other types of identification and data storage modules. Still further, while identification modules are described, one skilled in the art would appreciate that any electronics module or sensor that may be desired for a particular application, may be packaged as described, such that the electronics module may be utilized in a high pressure and/or high temperature environment.

As will be discussed and illustrated further below with regard to FIGS. 2-10D, each of the embodiments of the RFID tag 12 include a carrier, having an electronics module suitably packaged therein. The electronics module has the ability to store an identifier and an associated integrated circuit as applicable for storing and processing information and manipulating RF signals. The electronics module further includes an antenna for transmitting and receiving RF signals. The RFID tag 12 may be passive, active, or semi-active. Passive RFID tags rely on the reader to provide the power source for activation. While passive RFID tags 12 may be employed for certain applications, active or semi-active RFID tags 12 may be more suitable for applications where the reader 14 is located beyond the range of the RFID tags 12 ability to passively communicate with a reader. If the RFID tag 12 is active or semi-active, the RFID tag 12 may include a battery for transmission of RF signals.

In the embodiment illustrated in FIG. 1A, the RFID tag 12 is installed into the surface of a pipe 16. For instance, the pipe 16 may be part of machinery that may be used in a downhole or subsea drilling operation. While the RFID tag 12 illustrated in FIG. 1A is installed into the surface of a pipe 16, the RFID tag 12 in accordance with embodiments of the invention is designed to be installed into the surface of other materials, tools or equipment, such as weldments, castings, or any object or material having a thickness large enough to receive the RFID tag 12 within the object or material. Advantageously, by embedding the RFID tag 12 into the surface of a material, the material itself provides the RFID tag 12 with surrounding protection from physical stresses and reduces the potential for the RFID tag 12 to be dislodged from the tool by mechanical forces. That is, because the RFID tag 12 is entirely recessed into the surface of the material, and thus contained entirely within the geometry of the material (e.g., pipe 16), the material provides protection of the RFID tag 12 from impacts, abrasion and other deleterious effects or events which could destroy or dislodge a surface mounted tag.

FIG. 1B illustrates an enlarged view of the RFID tag 12 of FIG. 1A. As illustrated, the RFID tag 12 is installed within a pre-formed tag pocket 18. The tag pocket 18 may be formed in the surface of the pipe 16 by a drilling process. Advantageously, the tag pocket 18 may be formed by a single drill and may be formed in existing equipment or tools, to retrofit the equipment or tools with an identification and tracking mechanism (i.e., the RFID tag 12). As illustrated in FIG. 1B, the tag pocket 18 is sized to receive the RFID tag 12, such that the RFID tag 12 is embedded completely within the pipe 16. That is, the depth of the tag pocket 18 is greater than or equal to the thickness of the RFID tag 12. In the illustrated embodiment, the RFID tag 12, and corresponding tag pocket 18, may including threading 20 such that the RFID tag 12 may be rotatably engaged within the pipe 16. In certain embodiments, the RFID tag 12 is secured into the tag pocket 18 by purely mechanical and frictional forces, such as by rotating the RFID tag 12, such that the threading 20 of the RFID tag 12 mateably engages like-threading in the tag pocket 18. Alternatively, an adhesive, epoxy or glue (not shown) suitable for the intended field application, may be used in conjunction with, or alternatively, instead of, the threading 20, to mechanically couple the RFID tag 12 to the pipe 16. In one embodiment, the density of the threading 20 may be 20 threads/inch or coarser. For instance, the density of the threading 20 may be 16 threads/inch.

Referring now to FIG. 1C, aspects of the tag pocket 18 are described. Specifically, FIG. 1C illustrates a cross sectional view of the tag pocket 18. In one implementation, the tag pocket 18 is drilled into the surface of the pipe 16. As will be appreciated, such a pocket 18 may be drilled in the surface of any material or tool having a thickness greater than the pocket depth PD necessary to completely contain the RFID tag 12. The material in which the tag pocket 18 is formed is typically a hard material, such as steel, and may be any tool, equipment or object, for which RFID tracking is desired. As will be understood, in the illustrated embodiment, the tag pocket 18 is sized and shaped such that the RFID tag 12 can be disposed therein, in a mated relationship and secured by the threading 20. The tag pocket 18 may be formed in the pipe 16 using a drill with an appropriately sized drill bit.

Correspondent to the RFID tag 12 described with reference to FIGS. 2 and 3, the illustrated embodiment of the tag pocket 18 has a thread depth TD which indicates the thickness (depth) of the threaded portion of the RFID tag 12. The thread relief diameter TRD indicates the diameter of the widest portion of the threading 20. As also indicated in FIG. 1C, the illustrated pipe 16 has an outer dimension OD (here a circumference). A wear limit diameter WLD is also illustrated to provide a sufficient distance (here a circumference) from the edge of the pipe 16, such that the RFID tag 12 may be completely embedded within the pipe 16. The wear limit diameter WLD indicates the minimum diameter of the RFID tag 12. If the surface of the material in which that tag pocket 18 were being drilled was flat, the WLD and OD would be equal and the pocket depth PD would be equal to the thickness of the RFID tag 12. However, because the surface of the pipe 16 is curved, the pocket depth PD may be adjusted in accordance with the diameter of the pipe, such that a certain depth is added to the WLD to ensure that the RFID tag 12 may be completely embedded with the pipe 16.

As will be appreciated, the illustrated threading 20 may be provided for a screw fitting and used in conjunction with or instead of an epoxy which may also be deposited within the tag pocket 18 to secure the RFID tag 12 therein. In certain embodiments, wherein the surface of the tag pocket 18 includes threading 20, the RFID tag 12 may have similar threading 20 to mate with the surface within the tag pocket 18. In this case, the RFID tag 12 may be rotated or screwed into the tag pocket 18. In embodiments where the threading 20 is not included, the RFID tag 12 may be inserted into the pre-formed tag pocket 18, after an epoxy has been dispensed within the tag pocket 18, to partially fill the tag pocket 18. The RFID tag 12 is then pressed into the epoxy to eliminate any voids in the tag pocket 18. The tag pocket 18 may be ridged or abrasive to add frictional forces to the epoxy disposed in the tag pocket 18 if threading 20 is not employed.

Figure 3:
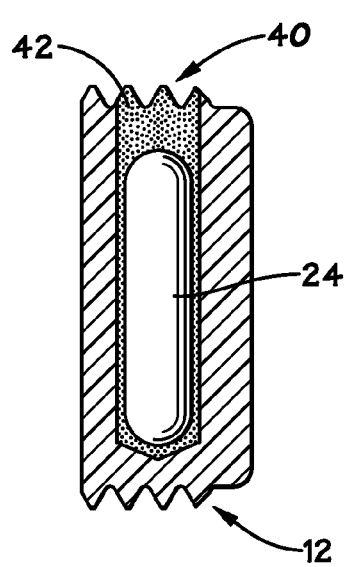

Referring now to FIGS. 2 and 3, two views of one embodiment of the RFID tag 12 are illustrated. In one embodiment, the diameter D of the RFID tag 12 may be in the range of approximately 0.50 to 1.5 inches, and have a thickness T in the range of approximately 0.20 to 0.50 inches. The RFID tag 12 includes a bead 24 and a carrier 26, configured to house and contain the bead 24. In one embodiment, the bead 24 may be a glass. Advantageously, glass is both chemically inert and may be resistant to mechanical pressures up to, and possibly exceeding, 40,000 PSI, when the pressures are evenly distributed. The bead 24 includes an electronics module 28, contained therein.

Figure 4:
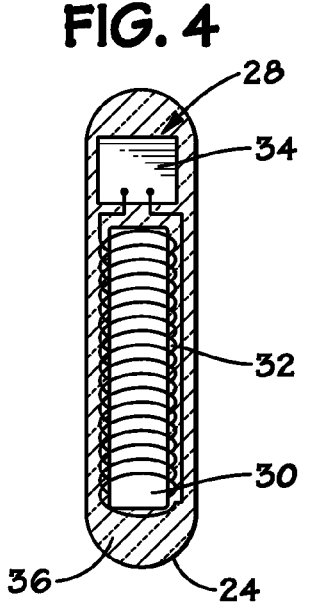

Referring briefly to FIG. 4, one embodiment of the electronics module 28, contained within the bead 24 is illustrated. Specifically, the electronics module 28 may be a low frequency RFID electronics module 28 within the impermeable spherically ended cylinder or bead 24 made of high purity industrial glass. For some applications, an optimal frequency for the RFID electronics module 28 is 125 KHz-135 KHz, but in other applications a different frequency range may be preferred. In some applications, ultra low frequency, high frequency, ultra high frequency or frequency combination RFID electronics module 28 can be used.

Referring still to FIG. 4, in one embodiment, the electronics module 28 contains a dipole including a ferrite core 30 and an antenna 32, which is wrapped around the ferrite core 30. The antenna 32 may be bonded to the integrated circuit 34, which includes the identification information stored thereon for reading the RFID tag 12. In one embodiment, the integrated circuit includes a bipolar integrated circuit. RF Acoustic Wave devices may be employed in a similar manner where higher temperatures and/or pressures are experienced during usage. The electronics module 28 includes wire bondings that are appropriate for the sustained high and low temperatures and carries an identifier in such a manner that the identity of the RFID tag 12 will not be lost during sustained high temperature exposure. The use of a dipole RFID tag 12 may provide desirable performance when installed within a radio opaque material, such as a steel material. The design enables longer read distances with any RF based system, especially low frequency RF systems.

In one embodiment, the electronics module 28 is packed in the glass bead 24 within a silicone gel material 36, or other incompressible liquid, to provide consistent fluid-like pressure to the electronics module 28. Advantageously, the silicone gel material 36 absorbs vibration and avoids crystallization at sustained high temperatures. Potting and filler materials may also be used to package the electronics module 28 within the bead 24. In one embodiment, the electronics module 28 includes packing materials which allow operation of the RFID tag 12 at sustained temperatures over 165° C., and in another embodiment, over 180° C. The electronics module 28 is designed such that it will continue to perform well in high magnetic fields and such that it will not be destroyed by rapid and strong magnetic fluctuations to which it may be exposed.

Referring again to FIGS. 2 and 3, in one embodiment, the carrier 26 is generally circular or disk-shaped. In one embodiment, the carrier 26 may be formed using a high performance thermoplastic, such as PolyEtherEtherKetone (PEEK). Advantageously, PEEK thermoplastic is highly resistant to chemicals, has high strength, absorbs impacts well, has a high melting point and maintains a low brittleness at very low temperature. Pigment can be added to the plastic for UV resistance as desired. Alternatively, other radio transparent materials can be used instead of PEEK thermoplastic, depending on the environmental and operational characteristics of the application. For example, Acrylonitrile Butadiene Styrene (ABS) or other molded plastic could be used under some environmental and operational conditions. A disk of ceramic or other highly inert and abrasion resistant material may be added to the surface of the carrier 26 to increase abrasion resistance beyond the PEEK capabilities. Similarly, the entire material containing the carrier 26 may be formed of a ceramic or alternate material with the appropriate properties for the described environmental conditions.

The carrier 26 may also include holes or openings 38 which provide pressure equalization across the RFID tag 12. Further, the openings 38 may aid in the mounting of the RFID tag 12 into a material or tool (e.g., pipe 16). The openings 38 in the carrier 26 also allow for easy handling of the RFID tag 12 using a tool. For instance, the openings 38 provide recesses in which a tool can be inserted to rotatably couple the RFID tag 12 into the material or tool (e.g., pipe 16). In one embodiment, the openings 38 may extend through the entire thickness of the RFID tag 12.

As described, the electronics module 24 is packaged within an impermeable material (e.g., silicone gel 36, surround by glass) which is in turn packaged within the carrier material (e.g., PEEK), which is then mounted within the object or material (e.g., pipe 16) mechanically or by adhesive. While the design of the bead 24, and particularly, the selection of a glass material having a silicone gel material 36 used to surround the electronics module 28, provides the electronics module 28 with sufficient protection at high temperatures and high pressures, the packaging of the bead 24 within the carrier 26 also presents a number of design challenges. In one embodiment, the bead 24 is inserted into a cavity 40 in the carrier 26 that minimizes stress on the glass bead 24 which contains the electronics module 28 (FIG. 4). The cavity 40 is formed in a direction parallel to the planar surface of the RFID tag 12, as shown.

As previously described in certain applications, especially downhole and subsea applications and other high temperature and high pressure environmental applications, the packaging of the bead 24 that holds the electronic module 28 should be robust in order to withstand such harsh environments. If the bead 24 were merely encapsulated within the carrier 26, such that the carrier material 26 contacts the bead 24, directly, the bead 24 may be damaged by deformation of the carrier material 26 at high temperatures or pressures, or combinations of both. In accordance with embodiments of the present invention, in order to protect the glass bead 24 within the carrier 26, the glass bead 24 is completely surrounded by a protective fluid-like fill material 42 disposed in the cavity 40 of the carrier 26, as illustrated in FIGS. 2 and 3. As used herein, a "protective fluid-like fill material" refers to a material that provides a uniform pressure to an object surrounded by the material, here the bead 24, over a temperature range of −65° C. to at least 210° C. and at pressures up to at least 40,000 PSI. Ideally, the protective fluid-like fill material 42 should be both physically inert and chemically inert to prevent degradation of the electronics module 28 with the bead 24. As used herein, the term "chemically inert" refers to a material that will not react with chemicals expected to be encountered for a given application (e.g., downhole or subsea applications), including chemicals in different phases or states. The term "physically inert" refers to materials that withstand temperatures and pressures and will not significantly expand or contract or produce vapors at temperatures or pressures expected for the given application.

Not only should the protective fluid-like fill material 42 be chemically and physically inert, but it should be chosen such that crystal formation, such as ice formation, is mitigated, as crystal formation in the cavity 40 could potentially damage the bead 24. As will be appreciated, if crystals form within the cavity 40, the bead 24 is more likely to be damaged.

In one embodiment, the protective fluid-like fill material 42 may comprise a gel such as a silicone gel. The silicone gel may be a silicone room-temperature vulcanizing (RTV) gel. For instance, silicone products SS-4060, SS-5060, SS-6060, and SS-6080 are suitable room temperature curing silicone RTV gels available from Silicone Solutions™. These gels, as well as other gels, are generally two-part, 1:1 mix ratio silicone materials that cure at room temperature within 180 minutes. As will be appreciated, while these gels may cure at room temperature, faster cure temperatures may be achieved using heat. Once cured, the silicone gel is highly resistant to ozone moisture and temperature degradation. In one embodiment, the protective fluid-like fill material 42, (e.g., one of the aforementioned silicone gels), may maintain its robust properties through temperatures ranging from −65° C. to 250° C. Further, the protective fluid-like fill material 42 provides a protective area for the glass bead 24 up to 40,000 PSI in fluid. In an alternative embodiment, the protective fluid-like fill material 42 may be halocarbon oil, which may provide similar qualities.

In one embodiment, during assembly of the RFID tag 12, the cavity 40 may be partially filled with the protective fluid-like fill material 42. Once the cavity 40 is partially filled, the glass bead 24 may be positioned within the cavity 40 such that it is surrounded completely at one end by the protective fluid-like fill material 42. Once the bead 24 is positioned, the remainder of the cavity 40 may be filled with the protective fluid-like fill material 42 such that the cavity 40 is completely filled and such that the glass bead 24 is completely surrounded by the protective fluid-like fill material 42, creating a complete barrier between the surface of the bead 24 and the walls of the carrier 26, within the cavity 40.

Advantageously the protective fluid-like fill material 42 is a soft material that provides even, compressive forces. As will be appreciated, the glass bead 24 is strong under consistent pressure in fluid but may be weak under bending or non-consistent pressures. The protective fluid-like fill material 42 is so soft such that it essentially acts as a fluid to apply consistent fluid forces to the glass bead 24 containing the electronics module 28. This isolates the glass bead 24 from physical bending and point pressure forces while also providing advantageous vibration dampening. Further, any microscopic bubbles entrapped in the soft gel (i.e., protective fluid-like fill material 42) are collapsed under pressure rather than creating a failure path as they would in a solid material, such as epoxy. Accordingly, the protective fluid-like fill material 42 provides additional durability for the RFID tag 12.

Figure 5:
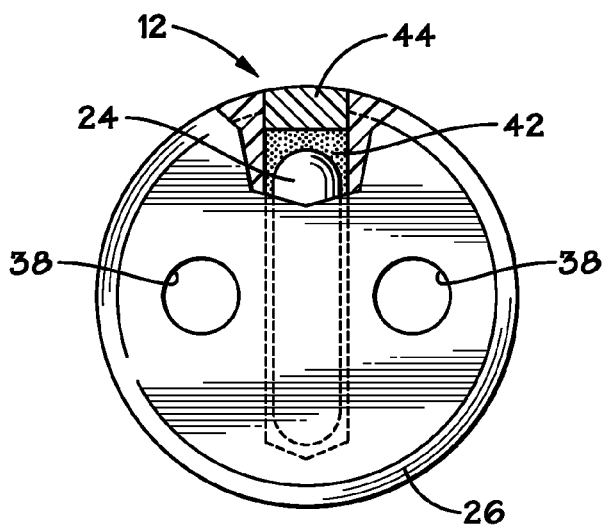
FIG. 5 illustrates a schematic view of the RFID tag, in accordance with a second embodiment of the invention.

While the silicone gel or halocarbon oil may provide sufficient protection for many applications, especially from mechanical forces as discussed above, in certain embodiments, it may be advantageous to also provide a membrane at the top of the cavity 40 to provide additional protection against chemical reaction of the underlying protective fluid-like fill material 42. Referring now to FIG. 5, an alternative embodiment including a membrane material 44 is illustrated. As illustrated in FIG. 5, rather than completely filling the cavity 40 with the protective fluid-like fill material 42, the cavity 40 is filled with protective fluid-like fill material 42 such that the fill material 42 completely surrounds the bead 24 but where a portion at the top of the cavity 40 is left unfilled. The remainder of the cavity 40 may then be filled with a membrane material 44. The membrane material 44 may provide additional protection of the underlying protective fluid-like fill material 42 from chemical reaction. In one embodiment, the membrane material 44 may be fast cure gasoline resistant silicone RTV adhesive sealant, such as SS-300, available from Silicone Solutions™. SS-300 is a 1-part silicone that cures within one hour. As will be appreciated, the membrane material 44 may be chosen to provide additional protection of the underlying protective fluid-like fill material 42 when chemical ingress and deterioration of the chosen protective fluid-like fill material 42 are of concern. Further, the membrane material 44 may be specifically chosen such that it is resistant to the chemicals and environmental affects which may be expected to be encountered in the particular application in which the RFID tag 12 is to be use.

Referring now to FIG. 6, another embodiment of the RFID tag 12 is illustrated. In the embodiment illustrated in FIG. 6, the cavity 40 is capped or over-filled with an over-fill material 46. In one embodiment, the over-fill material 46 may be the same material as the underlying protective fluid-like fill material 42. In certain applications, the over-fill material 46 may be sheared flush with the outside of the carrier 26. In one embodiment, the over-fill material 46 may comprise a silicone RTV material.

Referring now to FIG. 7, yet another embodiment of the RFID tag 12 is illustrated. As with the embodiment described with reference to FIG. 5 above, in the present embodiment, the protective fluid-like fill material 42 is disposed within the cavity 40 such that it completely surrounds the bead 24, but such that a portion at the top of the cavity 40 is left unfilled. In this embodiment, a cap 48 may be pressed into the top of the cavity 40. As with the membrane material 44, the hard cap 48 provides additional protection of the underlying protective fluid-like fill material 42, especially from chemicals. As will be appreciated, the cap 48 is sized to be frictionally secured within the cavity 40. In one embodiment, the cap 48 may comprise fluorosilicone, perfluoroelastomer (FFKM), Aflas™ or such as polytetrafluoroethylene (PTFE), also known as Teflon™. Providing the cap 48 comprising a solid material introduces a chemically inert barrier to the protective fluid-like underlying fill material 42. FIGS. 8 and 9 illustrate two embodiments of caps 48 that may be employed. Each cap 48 includes one or more recessed regions 50 which provide relief such that the cap 48 may be deformed somewhat in high pressure environments in a manner that will increase the sealing function of the cap 48 against the walls of the cavity 40 in the carrier 26. The number of cavities 50 may depend on the thickness of the cap 48 such that the cap 48 may be readily deformed or flexed downward about the cavities 50 to evenly transmit pressure to the protective fluid-like fill material 42.

Figure 10B:
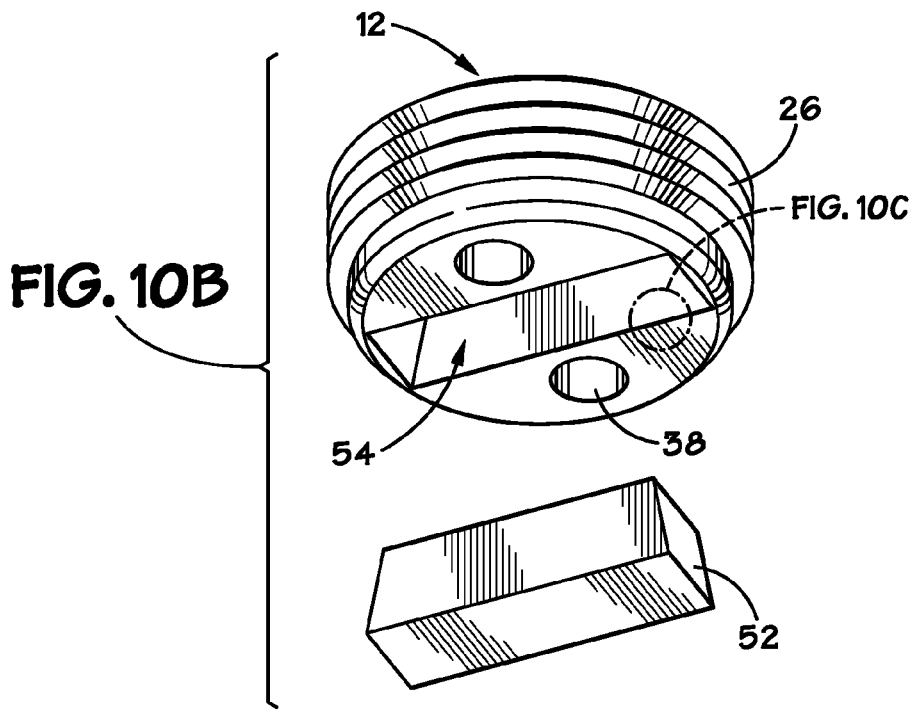
Figure 10C:
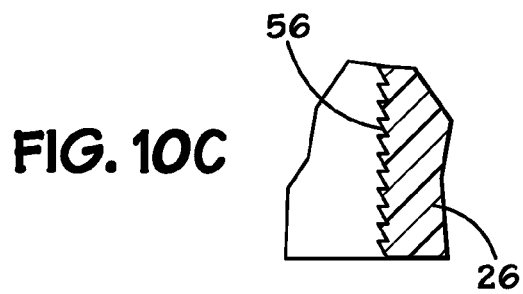
Figure 10D:
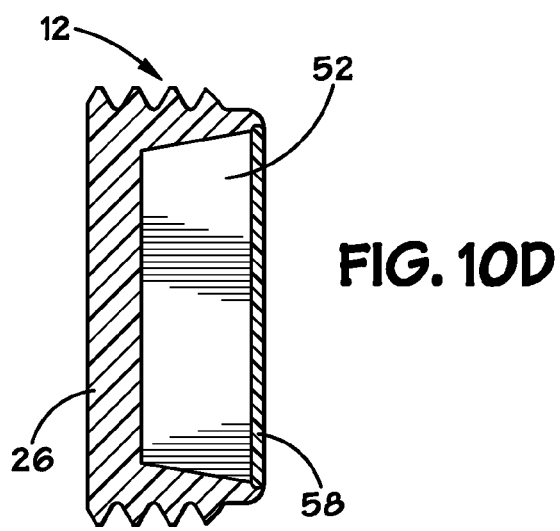

FIGS. 10A-10D illustrate another embodiment of the RFID tag 12. As illustrated, the carrier 26 may be fabricated with a segment cavity 54, as best shown in FIG. 10B. An independent carrier segment 52 may be fabricated separately. The carrier segment 52 includes a cavity 40, as previously described and illustrated, wherein the glass bead 24 is completely surrounded by a protective fluid-like fill material 42. The carrier segment 52 may be inserted into the segment cavity 54 of the carrier 26. The carrier segment 52 may be made of the same material as the underlying carrier 26. In one embodiment, the sides of the cavity 54 and carrier segment 52 may have a smooth, tapered surface. This provides a self-sealing, self-compressing mating system that works with the pressure to improve the reliability of the mating. In another embodiment, the sides of the cavity 54 in which the carrier segment 52 is deposited may be ridged, as best illustrated in FIG. 10C. The ridges 56 may provide a mechanism to mechanically secure the carrier segment 52 within the carrier 26. In addition, an adhesive (not shown) may be disposed within the segment cavity 54 in addition to or instead of the employing the ridges 56 such that the carrier segment 52 may be secured within the carrier 26. As illustrated in FIG. 10D, an additional sealant material 58 may be disposed on top of the carrier segment 52 such that the carrier segment 52 is further secured within the segment cavity 54. As will be appreciated, the sealant material 58 may be omitted.

In one embodiment of a fabrication process of the embodiments illustrated in FIGS. 10A-10D, the carrier segment 52 includes a cavity (not shown). During assembly of the RFID tag 12, the protective fluid-like fill material 42 is disposed into the cavity. The glass bead 24 may then be positioned within the cavity such that it is surrounded completely by the protective fluid-like fill material 42, creating a complete barrier between the surface of the bead 24 and the walls of the carrier 26, within the cavity. Next, the carrier segment 52 may be heat treated. In one embodiment, the heat treatment may be approximately 1 hour at a temperature range of approximately 65° C. to 120° C. Because of its expansive properties, while curing the protective fluid-like fill material 42 expands during the heat treatment, such that the cavity is over-filled with the protective fluid-like fill material 42. After the carrier segment 52 is heat treated, in may be inserted into the cavity 54 in the carrier 26. The application of physical force during the insertion of the carrier segment 52 into the carrier 26 will advantageously shear the excess protective fluid-like fill material 42, such that it is flush with the tapered edge of the carrier segment 52 and such that the entire cavity within the carrier segment 52 is completely filled with the protective fluid-like fill material 42, without voids being present within the cavity.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An identification tag, comprising:
   a rigid carrier comprising a cavity therein;
   a bead arranged within the cavity, wherein the bead includes an electronics module configured to receive and transmit signals; and
   a protective fluid-like fill material disposed in the cavity such that it completely surrounds the bead.

2. The identification tag, as set forth in claim 1, wherein the bead comprises a glass bead.

3. The identification tag, as set forth in claim 1, wherein the bead comprises an impermeable material.

4. The identification tag, as set forth in claim 1, wherein the protective fluid-like fill material comprises a silicone gel.

5. The identification tag, as set forth in claim 1, wherein the protective fluid-like fill material comprises a silicone room-temperature vulcanizing (RTV) gel.

6. The identification tag, as set forth in claim 1, wherein the rigid carrier comprises a thermoplastic.

7. The identification tag, as set forth in claim 6, wherein the thermoplastic comprises a PolyEtherEtherKetone (PEEK).

8. The identification tag, as set forth in claim 1, wherein the electronics module comprises a dipole antenna.

9. The identification tag, as set forth in claim 1, wherein the electronics module comprises an RFID module configured to operate at a frequency in the range of approximately 125 KHz-135 KHz.

10. The identification tag, as set forth in claim 1, wherein the electronics module comprises an integrated circuit and an antenna.

11. The identification tag, as set forth in claim 1, wherein the identification tag is configured to operate at pressures greater than or equal to 20,000 psi.

12. The identification tag, as set forth in claim 1, wherein the identification tag is configured to operate at sustained temperatures greater than or equal to 165° C.

13. The identification tag, as set forth in claim 1, comprising a membrane material disposed in the cavity on top of the protective fluid-like fill material.

14. The identification tag, as set forth in claim 13, wherein the membrane material comprises silicone.

15. The identification tag, as set forth in claim 13, wherein the membrane material comprises, a fast curing silicone room-temperature vulcanizing (RTV) adhesive rubber.

16. The identification tag, as set forth in claim 1, comprising a chemically inert cap disposed in the cavity on top of the protective fluid-like fill material.

17. The identification tag, as set forth in claim 16, wherein the cap comprises a fluorosilicone material.

18. The identification tag, as set forth in claim 16, wherein the cap comprises a polytetrafluoroethylene (PTFE) material.

19. The identification tag, as set forth in claim 1, further comprising a carrier segment configured to mate with the rigid carrier.

20. The identification tag, as set forth in claim 1, wherein the identification tag comprises an RFID tag.

21. A system comprising:
    a tool having a tag pocket formed in a surface of the tool;
    an RFID tag secured within the tag pocket such that the RFID tag is embedded within the tool, wherein the RFID tag comprises a carrier having a protective fluid-like fill material therein and an electronics module contained within the protective fluid-like fill material.

22. The system, as set forth in claim 21, wherein the tool comprises a pipe configured for downhole or subsea usage.

23. The system, as set forth in claim 21, wherein the electronics module is surrounded by a glass bead, and wherein the glass bead is completely surrounded by the protective fluid-like fill material.

24. The system, as set forth in claim 21, wherein the tag pocket comprises threading and wherein the RFID tag is rotatably coupled into the tag pocket.

25. The system, as set forth in claim 21, wherein the RFID tag is mechanically secured within the tag pocket via an adhesive or epoxy.

26. The system, as set forth in claim 21, comprising a carrier segment having the RFID tag surrounded by the protective fluid-like fill material formed therein, wherein the carrier segment is configured to be inserted into a segment cavity of the carrier.

27. The system, as set forth in claim 21, wherein the RFID tag is completely embedded within the tool.

28. The system, as set forth in claim 21, wherein the RFID tag is disk-shaped.

29. A method of fabricating a tag, comprising:
    providing a carrier having a cavity therein;
    at least partially filling the cavity with a protective fluid-like fill material; and depositing an electronics module into the protective fluid-like fill material.

30. The method, as set forth in claim 29, wherein depositing the electronics module comprises depositing a glass bead, having an electronics module therein, into the protective fluid-like fill material.

31. The method, as set forth in claim 29, further comprising depositing a membrane material into the cavity and on top of the protective fluid-like fill material.

32. The method, as set forth in claim 29, further comprising depositing a cap into the cavity and on top of the protective fluid-like fill material.

33. The method, as set forth in claim 29, wherein at least partially filling comprises over-filling the cavity with the protective fluid-like fill material.

34. The method, as set forth in claim 29, wherein at least partially filling the cavity comprises partially filling the cavity with the protective fluid-like fill material before depositing the electronics module into the protective fluid-like fill material, and depositing additional protective fluid-like fill material into the cavity after the electronics module is deposited.

35. A method of fabricating a tag, comprising:
   providing a carrier segment having a cavity therein;
   depositing a protective fluid-like fill material into the cavity;
   depositing an electronics module into the protective fluid-like fill material;
   heating the carrier segment such that the protective fluid-like fill material expands to over-fill the cavity in the carrier segment; and
   inserting the carrier segment into a cavity in a carrier, such that over-filled portions of the protective fluid-like fill material are sheared from a surface of the carrier segment, and such that the protective fluid-like fill material within the cavity in the carrier segment is void-free.

* * * * *